US009876950B2

(12) United States Patent
Nakamura

(10) Patent No.: US 9,876,950 B2
(45) Date of Patent: Jan. 23, 2018

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventor: Hinako Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/961,473

(22) Filed: Dec. 7, 2015

(65) Prior Publication Data
US 2016/0173759 A1 Jun. 16, 2016

(30) Foreign Application Priority Data
Dec. 11, 2014 (JP) .................. 2014-251272

(51) Int. Cl.
H04N 5/232 (2006.01)
G06K 9/00 (2006.01)
G06K 9/52 (2006.01)
H04N 5/235 (2006.01)
G06K 9/46 (2006.01)

(52) U.S. Cl.
CPC ..... *H04N 5/23212* (2013.01); *G06K 9/00268* (2013.01); *G06K 9/00362* (2013.01); *G06K 9/52* (2013.01); *H04N 5/2351* (2013.01); *H04N 5/23219* (2013.01); *G06K 9/00248* (2013.01); *G06K 9/4604* (2013.01)

(58) Field of Classification Search
CPC .......... H04N 5/23212; H04N 5/23219; H04N 5/2351; G06K 9/00268; G06K 9/00362; G06K 9/52; G06K 9/4604; G06K 9/00248; G06T 7/60; G06T 7/0042; G06T 2207/30196
See application file for complete search history.

(56) References Cited

U.S. PATENT DOCUMENTS

2008/0008361 A1* 1/2008 Nozaki ................. H04N 5/232
382/118
2008/0122939 A1* 5/2008 Hirai ................. H04N 5/23212
348/222.1
(Continued)

FOREIGN PATENT DOCUMENTS

JP 61-123368 A 6/1986
JP 2003-107555 A 4/2003

Primary Examiner — Jason Flohre
(74) Attorney, Agent, or Firm — Canon USA Inc., IP Division

(57) ABSTRACT

An image capturing apparatus capable of setting a focus detection area in an imaging range includes a photometry unit, a face detection unit configured to detect a face area, and a photometry area setting unit configured to set a position of a main photometry area. When a user sets the focus detection area and the face detection unit detects a face area, the photometry area setting unit determines whether to set a position of the main photometry area to a position corresponding to the face area or to set a position of the main photometry area to a position corresponding to the focus detection area based on information regarding the face area and information regarding the focus detection area set by the user, and the photometry unit performs photometry on the object based on the position of the main photometry area set by the photometry area setting unit.

19 Claims, 9 Drawing Sheets

(56) References Cited

U.S. PATENT DOCUMENTS

| | | | |
|---|---|---|---|
| 2009/0041355 A1* | 2/2009 | Sakaji | H04N 5/23212 382/190 |
| 2009/0041445 A1* | 2/2009 | Yoshida | H04N 5/23219 396/121 |
| 2009/0316016 A1* | 12/2009 | Iwamoto | H04N 5/23219 348/222.1 |
| 2010/0033592 A1* | 2/2010 | Oyama | H04N 5/23219 348/222.1 |
| 2011/0248942 A1* | 10/2011 | Yana | H04N 5/23212 345/173 |
| 2011/0249961 A1* | 10/2011 | Brunner | H04N 5/23216 396/213 |
| 2012/0013786 A1* | 1/2012 | Yasuda | H04N 5/23219 348/349 |
| 2012/0300035 A1* | 11/2012 | Okamoto | H04N 5/23212 348/46 |
| 2013/0002884 A1* | 1/2013 | Nakagawara | H04N 5/23212 348/169 |
| 2013/0155276 A1* | 6/2013 | Ueda | H04N 5/23293 348/223.1 |

* cited by examiner

IMAGE CAPTURING APPARATUS, CONTROL METHOD THEREOF, AND STORAGE MEDIUM

BACKGROUND OF THE INVENTION

Field of the Invention

The present invention relates to exposure control of an image capturing apparatus to which a user can arbitrarily set a focus detection area.

Description of the Related Art

Techniques for setting a focus detection area in an image capturing process are known. In order to appropriately set the brightness of a face included in an object image, Japanese Patent Application Laid-Open No. 2003-107555 describes an image capturing apparatus which detects a face of a person from input image data and calculates an exposure amount based on a photometry result obtained by setting the detected person's face as a photometry area.

In addition, it is known that a user arbitrarily sets an area for detecting a focus evaluation value of an object (hereinbelow referred to as a "focus detection area") in a screen, and a main photometry area is set based on the focus detection area. In this case, exposure control can be performed according to the brightness of the focus detection area arbitrarily set by the user in the screen.

Japanese Patent Application Laid-Open No. 61-123368 describes a camera which moves an exposure measurement field in response to a position of an arbitrarily set focus detection field.

SUMMARY OF THE INVENTION

An aspect of the claimed invention is directed to an image capturing apparatus configured to set a focus detection area to a position in an imaging range. The image capturing apparatus includes a photometry unit configured to perform photometry on an object, a face detection unit configured to detect a face area included in the imaging range, and a photometry area setting unit configured to set a position of a main photometry area in the imaging range. In a case where a user sets the focus detection area to a position in the imaging range and the face detection unit detects the face area, the photometry area setting unit determines whether to set a position of the main photometry area to a position corresponding to the face area or to set a position of the main photometry area to a position corresponding to the focus detection area based on information regarding the face area and information regarding the focus detection area set by the user, and wherein the photometry unit performs photometry on an object based on a position of the main photometry area set by the photometry area setting unit.

According to the claimed invention, when a user arbitrarily sets a focus detection area and a face area is included in an imaging range, the exposure control can be appropriately performed based on information regarding the face area and information regarding the focus detection area set by the user.

Further features of the present invention will become apparent from the following description of exemplary embodiments with reference to the attached drawings.

DESCRIPTION OF THE EMBODIMENTS

Figure 1:
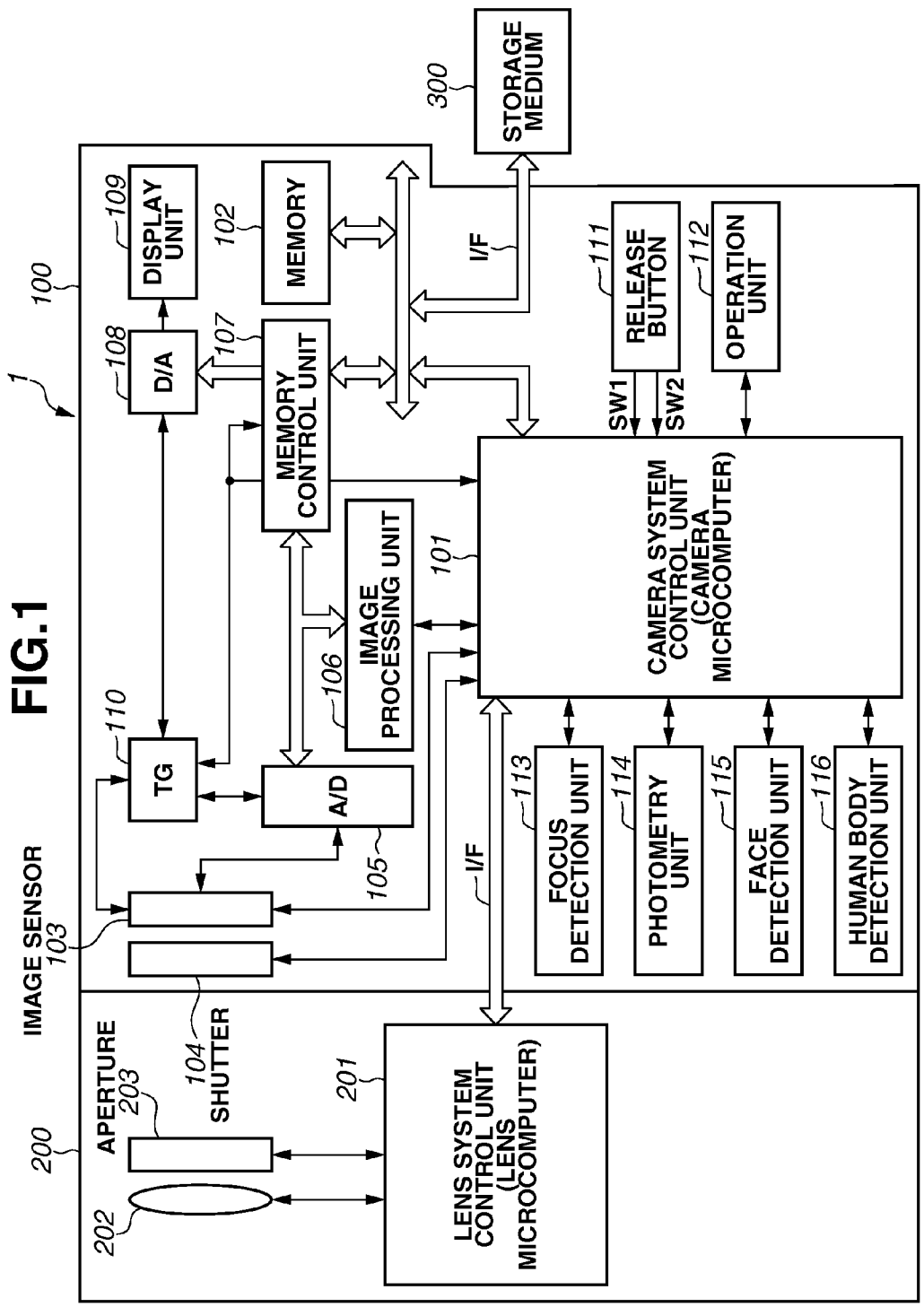
FIG. 1 is a block diagram illustrating a configuration of a digital camera 1 which is a first exemplary embodiment of an image capturing apparatus according to the present invention.

Various exemplary embodiments of the present invention will be described below with reference to the attached drawings. FIG. 1 is a block diagram illustrating a configuration of a digital camera (hereinbelow referred to as a camera) 1 which is a first exemplary embodiment of an image capturing apparatus according to the present invention. The camera 1 according to the present exemplary embodiment includes a camera main body 100 and a lens unit 200 which can be attached to and detached from the camera main body 100. The configuration of the camera 1 in a state in which the lens unit 200 is attached to the camera main body 100 is described below with reference to FIG. 1. The camera 1 may adopt a configuration that the camera main body 100 and the lens unit 200 are integrally formed.

A camera system control unit (hereinbelow referred to as a camera microcomputer) 101 is a controller which comprehensively controls each unit in the camera 1. A memory 102 is a memory, such as a random access memory (RAM) and a read-only memory (ROM), connected to the camera microcomputer 101.

An image sensor 103 is a charge storage type image sensor, such as a complementary metal oxide semiconductor (CMOS), which performs photoelectric conversion on a light flux (an optical image of an object) incident through the lens unit 200 and outputs analog image data. A shutter 104 has a light-shielding state for shielding the image sensor 103 from the light flux incident through the lens unit 200 and a retracted state for guiding an optical image of an object incident through the lens unit 200 to the image sensor 103. The shutter 104 is driven in response to an instruction from the camera microcomputer 101 and switches the above-described light-shielding state and retracted state.

An analog-to-digital (A/D) conversion unit 105 is an A/D conversion circuit which converts analog image data output from the image sensor 103 to digital image data. The digital image data converted by the A/D conversion unit 105 is recorded to the memory 102.

An image processing unit 106 is an image processing module which performs predetermined image interpolation, resizing processing, color conversion processing, calculation processing of the number of pixel data, such as a saturated pixel and an underexposure pixel, and other processing on image data output from the A/D conversion unit 105 or a memory control unit 107.

A digital-to-analog (D/A) conversion unit 108 is a D/A conversion circuit which converts the digital image data recorded to the memory 102 to analog image data for display.

A display unit 109 is a display screen including a thin film transistor driving type liquid crystal display (a TFT type LCD) and the like and can display the analog image data for display. The display unit 109 according to the present exemplary embodiment can perform live view display by successively displaying the analog image data output from the D/A conversion unit 108. In addition, the display unit 109 can display various types of information other than the obtained image data.

A timing generator (hereinbelow referred to as TG) 110 is a timing circuit which transmits to each unit in the camera 1 various timing signals related to operations in the camera 1, such as a change in exposure and a frame rate of the image sensor 103 and driving of the shutter 104.

A release button 111 and an operation unit 112 are a user operation interface which allows a user to input various operation instructions to the camera 1. The release button 111 is an instruction interface which allows the user to instruct a start of an image capturing preparation operation and an image capturing operation. In response to a user operating the user operation interface, for example, when the user changes the release button 111 to a SW1 state (for example, half press), the camera microcomputer 101 instructs a start of the image capturing preparation operation, and focus detection processing, photometry operation processing, and the like. Further, in response to the user operation to change the release button 111 to a SW2 state (for example, full press), the camera microcomputer 101 instructs a start of the image capturing operation, and a series of processing from capturing of an image of an object to generation (obtaining) of an image.

The operation unit 112 is an input interface including operation members, such as a switch, a button, and a dial, for a user to input various instructions and settings to the camera main body 100, and a power source switch, a menu button, a direction instruction button, and the like.

The display unit 109 may be an electrostatic capacitance type touch panel configured to enable a user to input information by operating a graphical user interface (GUI) displayed on the display unit 109 which is similar or alternate to operating the above-described release button 111 and operation unit 112.

A focus detection unit 113 is a focus detection module which detects a focus evaluation value used in focus adjustment based on image data output from the image processing unit 106. The camera microcomputer 101 performs control to change a lens position (hereinbelow referred to as focus control) of a focus lens included in an imaging lens group 202 so as to bring an object into a focused state based on the focus evaluation value detected by the focus detection unit 113. Further, the camera microcomputer 101 can obtain information regarding a distance to an object included in an imaging range (in an imaging screen) based on information regarding the focus evaluation value of the object detected by the focus detection unit 113. The above-described imaging range is an area approximately the same as an angle of view of image data obtained by the image sensor 103 and an area in which an image of an object can be captured.

According to the present exemplary embodiment, the camera 1 is configured to detect a focus evaluation value regarding contrast information indicating a contrast of obtained image data as the above-described focus evaluation value, however, the camera 1 is not limited to this configuration. For example, the camera 1 may be configured to detect a focus evaluation value regarding phase difference information indicating a phase difference of an object included in obtained image data.

According to the present exemplary embodiment, a plurality of areas for detecting a focus evaluation value of an object (hereinbelow referred to as a focus detection area) is prepared in advance at a position in an imaging range. Thus, a user can set the focus detection area at a position in the imaging range corresponding to an object that the user intends to capture images in the plurality of focus detection areas. Then, the focus detection unit 113 detects a focus evaluation value of the object corresponding to the focus detection area arbitrarily set by the user from among the plurality of the focus detection area sets in advance. In this regard, instead of setting a plurality of focus detection areas in advance, it may be configured to allow a user to set a focus detection area at an arbitrary position in the imaging range.

According to the present exemplary embodiment, a user operates the operation unit 112 and the like, and the focus detection area corresponding to the position in the imaging range intended by the user is set from among the plurality of focus detection areas displayed in the display unit 109 or a finder, not illustrated.

According to the present exemplary embodiment, the focus detection unit 113 is configured to detect a focus evaluation value of an object based on image data obtained by the image sensor 103, however, the focus detection unit 113 is not limited to this configuration. For example, the focus detection unit 113 may be configured to detect a focus evaluation value of an object based on an output of an auto focus (AF) sensor, not illustrated.

A photometry unit 114 is a photometry measuring circuit which performs photometry (measures brightness) on an object based on image data output from the image processing unit 106. More specifically, the photometry unit 114 performs photometry operation for calculating a brightness value (a photometry value) of the object based on the image data output from the image processing unit 106. The camera microcomputer (exposure controller) 101 performs control (exposure control) of an aperture value, a shutter speed, a gain amount, and the like based on information regarding the photometry value calculated by the photometry unit 114. According to the exposure control, the camera microcomputer 101 can set an exposure amount appropriate for brightness of the object.

According to the present exemplary embodiment, the camera 1 is configured to calculate a photometry value based on image data obtained by the image sensor 103, however, the camera 1 is not limited to this configuration. For example, the camera 1 may be configured to calculate the above-described photometry value based on an output of a photometry sensor, not illustrated.

The photometry unit 114 is also a photometry area setting unit which sets a position of a main photometry area in the imaging range in response to a set photometry method (a photometry mode). For example, when a photometry mode for performing centrally weighted evaluation photometry is set, the photometry unit 114 sets a position of the main photometry area near an approximate center of the imaging range. Then, the photometry unit 114 performs photometry on the object by putting weight on the approximate center of the image data to which the main photometry area is set.

Further, when a photometry mode for performing photometry on an object at an arbitrary position in the imaging range specified by a user is set, the photometry unit 114 sets the main photometry area to the arbitrary position in the imaging range specified by the user. Then, the photometry unit 114 performs photometry on the object by putting weight on the position to which the main photometry area is set in the imaging range.

According to the present exemplary embodiment, the camera 1 is configured to perform photometry only on an object included in the main photometry area within the imaging range. In other words, according to the present exemplary embodiment, the camera 1 is configured not to perform photometry on an object included in an area other than the main photometry area in the imaging range (excludes the object from a photometry target).

In contrast, the camera 1 may be configured to perform the above-described exposure control based on only a photometry result of photometry on the object included in the main photometry area while performing photometry on the entire imaging range. Further, the camera 1 may be configured to perform photometry on the entire imaging range and changes a degree of weighting with respect to the photometry result. For example, the photometry unit 114 may be configured to set a degree of weighting to a photometry result of an object included in the main photometry area in the imaging range larger than a degree of weighting to a photometry result of an object included in an area other than the main photometry area in the imaging range A face detection unit 115 is a face detection module which detects a face (a face area) of an object included in the imaging range based on image data output from the image processing unit 106. Face detection processing according to the present exemplary embodiment is described in detail below. The face detection processing described below is executed by the face detection unit 115 in response to an instruction from the camera microcomputer 101.

The face detection unit 115 performs band-pass filter processing in the horizontal direction on the image data output from the image processing unit 106 (or the memory 102). Further, the face detection unit 115 performs the band-pass filter processing in the vertical direction on the image data subjected to the above-described band-pass filter processing in the horizontal direction. By each of the above-described band-pass filter processing, an edge component is detected from the image data.

The face detection unit 115 then executes pattern matching processing based on the detected edge component and information regarding feature points of a face stored in advance in the memory 102 and extracts candidate groups of eyes, a nose, a mouth, and ears included in the image data.

Next, the face detection unit 115 determines a candidate which satisfies predetermined conditions in the extracted eye candidate group to narrow down the target to the eyes included in the image data. The conditions include, for example, a distance and a tilt between a pair of eyes and the like.

Further, the face detection unit 115 associates the narrowed-down eye candidate group with other parts (for example, a nose, a mouth, ears, and the like) corresponding to the eyes and applies a non facial condition filter stored in advance in the memory 102 to detect a face area included in the image data.

Furthermore, the face detection unit (calculation unit) 115 calculates a size (a face evaluation value) of the detected face area in the entire image. The face detection unit 115 also calculates a position of the detected face in the image. Lastly, the face detection unit 115 records face detection information, such as information regarding the detected face and the size of the face and information regarding the position in the imaging range, indicating a detection result of the face detection processing to the memory 102.

A human body detection unit 116 is a human body detection module which detects a human body (area) included in the image data (the imaging range) based on the image data obtained from the image processing unit 106 and the face detection information detected by the face detection unit 115. Thus, the human body detection unit 116 detects a human body area corresponding to the face detected by the face detection unit 115.

Human body detection processing according to the present exemplary embodiment is described in detail below. The human body detection processing described below is executed by the human body detection unit 116 in response to an instruction from the camera microcomputer 101. The human body detection unit 116 performs band-pass filter processing in the horizontal direction on the image data output from the image processing unit 106 (or the memory 102). Further, the human body detection unit 116 performs the band-pass filter processing in the vertical direction on the image data subjected to the above-described band-pass filter processing in the horizontal direction. Similar to the face detection processing described above, an edge component is detected from the image data by each of the above-described band-pass filter processing.

The human body detection unit 116 then executes pattern matching processing based on the detected edge component and information regarding feature points of a human body stored in advance in the memory 102. More specifically, the human body detection unit 116 determines whether the detected edge component corresponds to a contour shape of the human body area stored in advance in the memory 102 and detects the human body area included in the image data based on the edge component corresponding to the contour shape of the human body area.

Next, the human body detection unit 116 calculates a size of the detected human body area in the entire image data (the imaging range). The human body detection unit 116 further calculates a position of the detected human body area in the image data (the imaging range). Lastly, the human body detection unit 116 records human body detection information, such as information regarding the detected human body area and the size of the human body area and information regarding the position in the imaging range, indicating a detection result of the human body detection processing to the memory 102. For the face detection method and the human body detection method, a known method, such as a method for detecting color in an imaging range, may be adopted other than the above-described method.

The above-described focus detection unit 113, photometry unit 114, face detection unit 115, and human body detection unit 116 may be integrally disposed within the camera microcomputer 101. In addition, the camera microcomputer 101 may execute various control and processing executed by the focus detection unit 113, the photometry unit 114, the face detection unit 115, and the human body detection unit 116.

Operations of the camera 1 when an arbitrary single point AF mode or a face AF mode is set are described below as a method for the focus control. The arbitrary single point AF mode is a mode for performing the focus control based on a focus detection area on an arbitrary single point set by a user among a plurality of focus detection areas. The face AF mode is a mode for performing the focus control based on a focus detection area corresponding to a face area detected by the face detection unit 115. Various operations according to image capturing when the arbitrary single point AF mode or the face AF mode is set are described below.

The lens unit 200 is described in detail below. A lens system control unit (hereinbelow referred to as a lens microcomputer) 201 is a lens controller which comprehensively controls operations of the lens unit 200. The lens microcomputer 201 and the camera microcomputer 101 can communicate with each other via an interface (IF) illustrated in FIG. 1 as a double arrow in a state in which the lens unit 200 is attached to the camera main body 100. For example, information regarding the lens unit 200 attached to the camera main body 100 is output from the lens microcomputer 201 to the camera microcomputer 101 in response to an instruction from the camera microcomputer 101. When a user performs the focus control by manual operations, information regarding a lens position of the focus lens operated by the user is output from the lens microcomputer 201 to the camera microcomputer 101.

The imaging lens group 202 is a lens group including a plurality of lenses, such as an optical axis shift lens, a zoom lens, and a focus lens. An aperture 203 is a light amount adjustment member which adjusts a light amount of a light flux passing though the inside of the imaging lens group 202, and the lens microcomputer 201 controls the driving of the aperture 203. The operations of the imaging lens group 202 and the aperture 203 may be controlled by an instruction from the camera microcomputer 101.

A storage medium 300 is a storage medium, such as a memory card and a hard disk, which can record image data recorded in the memory 102. The storage medium 300 is not limited to a memory card or the like which is insertable and removable to and from the camera main body 100 and may include an optical disk such as a digital versatile disk rewritable (DVD-RW) disk and a magnetic disk such as a hard disk. Further, the storage medium 300 may not be detachable and be built in the camera main body 100 in advance. The basic configuration of the camera 1 according to the present exemplary embodiment has been described above.

Figure 2:
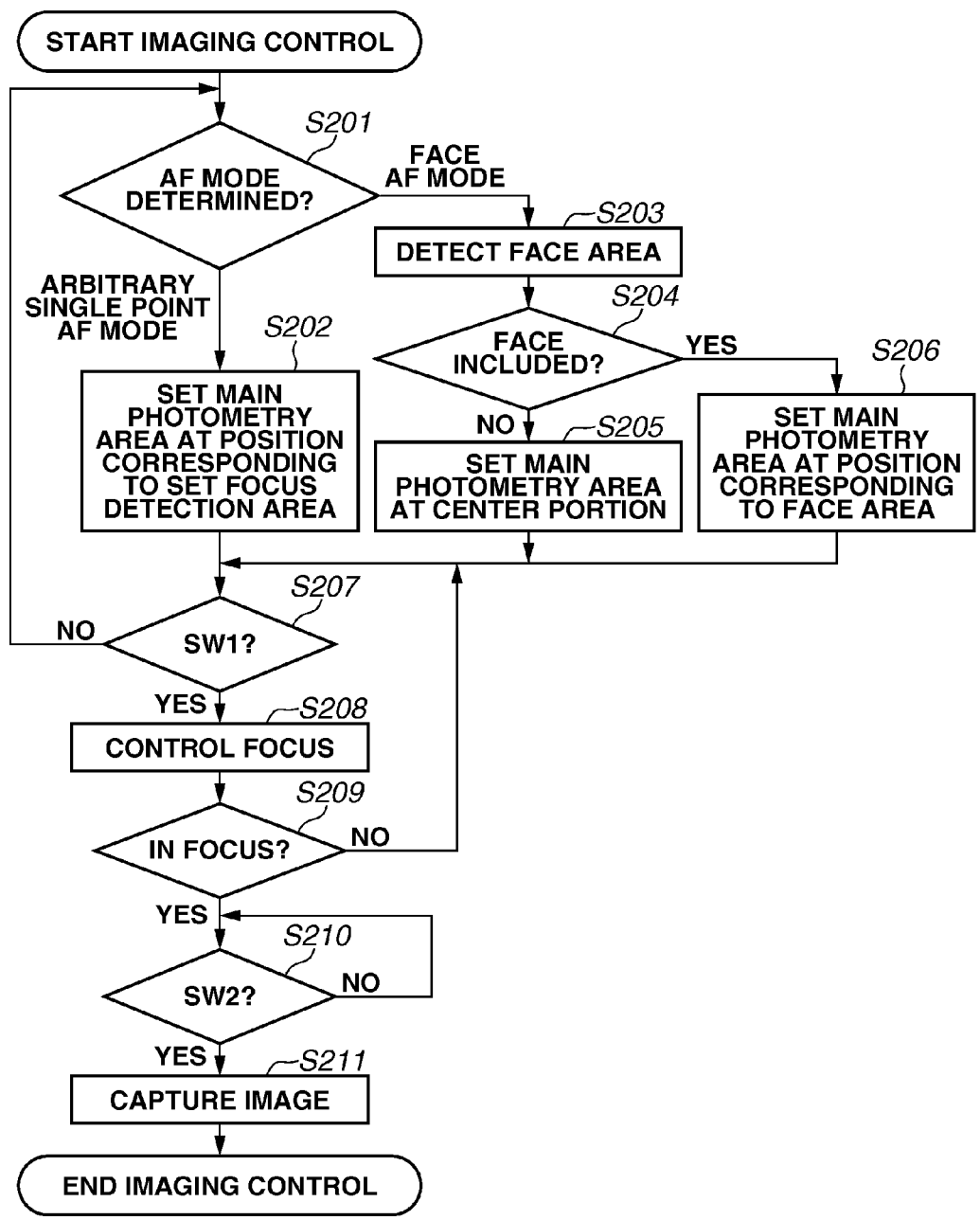
FIG. 2 is a flowchart illustrating first imaging control according to the first exemplary embodiment of the present invention.

Control regarding capturing an image of an object (hereinbelow referred to as imaging control) according to the present exemplary embodiment is described below with reference to FIG. 2. A flow of processing illustrated in FIG. 2 assumes that live view display or normal moving image capturing is executed as a case that image data obtained by the image sensor 103 is successively displayed on the display unit 109. FIG. 2 is a flowchart illustrating first imaging control according to the first exemplary embodiment of the present invention.

For the first imaging control according to the present exemplary embodiment, first, in step S201, the camera microcomputer 101 determines an AF mode set by a user in advance. If the camera microcomputer 101 determines that the arbitrary single point AF mode is set ("ARBITRARY SINGLE POINT AF MODE" in step S201), the processing proceeds to step S202. Whereas if the camera microcomputer 101 determines that the arbitrary single point AF mode is not set ("FACE AF MODE" in step S201), the processing proceeds to step S203.

In step S202, the photometry unit 114 sets the main photometry area based on the focus detection area set at a position in the imaging range. More specifically, the photometry unit 114 sets the position of the main photometry area so that a center of the focus detection area set in the imaging range set by a user matches with an approximate center of the main photometry area. Then, the photometry unit 114 performs photometry on the object based on the set main photometry area.

The position of the main photometry area may be a position at least corresponding to the position of the focus detection area in the imaging range set by the user. In other words, the main photometry area may be set so that photometry can be performed by putting weight on an object existing at the position of the focus detection area in the imaging range set by the user.

In step S203, the face detection unit 115 detects a face included in the imaging range (obtains the face detection information). In step S204, the camera microcomputer 101 determines whether a face is included in the imaging range based on the face detection information.

If the camera microcomputer 101 determines that a face is not included in the imaging range (NO in step S204), then in step S205, the photometry unit 114 sets the main photometry area to an approximate center portion of the imaging range and performs photometry on the object.

Whereas if the camera microcomputer 101 determines that a face is included in the imaging range (YES in step S204), then in step S206, the photometry unit 114 sets the main photometry area based on a position of the face in the imaging range and performs photometry on the object. In this case, a photometry area may be set according to a size of the detected face. The photometry processing is performed in a predetermined period until an image of the object is captured.

In each processing in the above-described steps S202, S205, and S206, the camera microcomputer (an exposure controller) 101 performs the exposure control to calculate an exposure amount appropriate for capturing an image of the object based on a photometry result by the photometry unit 114.

In step S207, the camera microcomputer 101 determines whether the release button 111 is in the SW1 state. If the camera microcomputer 101 determines that the release button 111 is in the SW1 state (YES in step S207), the processing proceeds to step S208. Whereas if the camera microcomputer 101 determines that the release button 111 is not in the SW1 state (NO in step S207), the processing returns to step S201 to perform photometry on the object again.

Next, in step S208, the focus detection unit 113 detects a focus evaluation value of the object in the focus detection area within the already set imaging range based on the AF mode determined in step S201. Then, the camera microcomputer 101 changes a lens position of the focus lens in the imaging lens group 202 based on the focus evaluation value of the object detected in step S208. In other words, in step S208, the focus control is executed in response to the AF mode set by the user.

Next, in step S209, the camera microcomputer 101 determines whether the object corresponding to the set focus detection area or the object corresponding to the detected face is in focus based on the image data in the state that the lens position of the focus lens is changed.

If the camera microcomputer 101 determines that the object is not in focus (NO in step S209), the processing returns to step S207 and waits until the release button 111 is turned into the SW1 state while repeating the photometry of the object.

Whereas if the camera microcomputer 101 determines that the object is in focus (YES in step S209), then in step S210, the camera microcomputer 101 determines whether the release button 111 is in the SW2 state.

If the camera microcomputer 101 determines that the release button 111 is in the SW2 state (YES in step S210), then in step S211, the camera microcomputer 101 controls an operation of each unit in the camera 1 to capture an image of the object at the calculated exposure amount. The captured image data obtained by the imaging is subjected to the above-described various processing and then recorded to the memory 102. The processing in step S210 is repeated until the release button 111 is turned into the SW2 state. The first imaging control according to the present exemplary embodiment has been described above.

In the above-described first imaging control, if a face is included in the imaging range when the arbitrary single point AF mode is set as the AF mode, the main photometry area is set to a position in the imaging range corresponding to the focus detection area set by the user. In this case, the exposure control is executed according to the position in the imaging range corresponding to the focus detection area set by the user. Therefore, the exposure amount is set so that the object corresponding to the position of the focus detection area set by the user has appropriate brightness. However, if an angle of view changes after the user sets the focus detection area when the arbitrary single point AF mode is set, the position of the focus detection area in the imaging range changes according to the change of the angle of view. In this case, the main photometry area is set to a position where the user does not intend in the imaging range, and photometry is performed on an object having lower importance of imaging for the user. Therefore, if the exposure control is executed based on a photometry result of the photometry, an exposure amount is set according to the brightness of the object having lower importance of imaging for the user. Accordingly, an image is obtained in which an object having higher importance of imaging for the user is unnaturally bright.

When the arbitrary single point AF mode is set and a focus detection area superimposed on a face does not exist in a plurality of focus detection areas prepared in advance, the focus detection area cannot be set according to a position of the face in the imaging range. In this case, the main photometry area cannot be set according to the face having higher importance of imaging for to the user. Especially, when a periphery of a face is much brighter than the face in backlight or the like, a photometry value largely changes by only slightly shifting a position of the set focus detection area from the position of the face. Therefore, in this case, the photometry is also performed on the object having lower importance of imaging for the user, and the exposure amount is set according to the brightness of the object having lower importance of imaging for the user.

As described above, if a face is included in the imaging range when the arbitrary single point AF mode is set, the detected face area, the focus detection area set by the user, and the like need to be considered.

According to the present exemplary embodiment, when the arbitrary single point AF mode is set and a face area is detected in the imaging range, the camera 1 deals with the above-described issues by switching (determining) whether to set the main photometry area to a position corresponding to the detected face area or to a position corresponding to the focus detection area. More specifically, the camera 1 according to the present exemplary embodiment switches (determines) a position in the imaging range to which the main photometry area is set based on a size of a detected face area (a face evaluation value).

Figure 3:
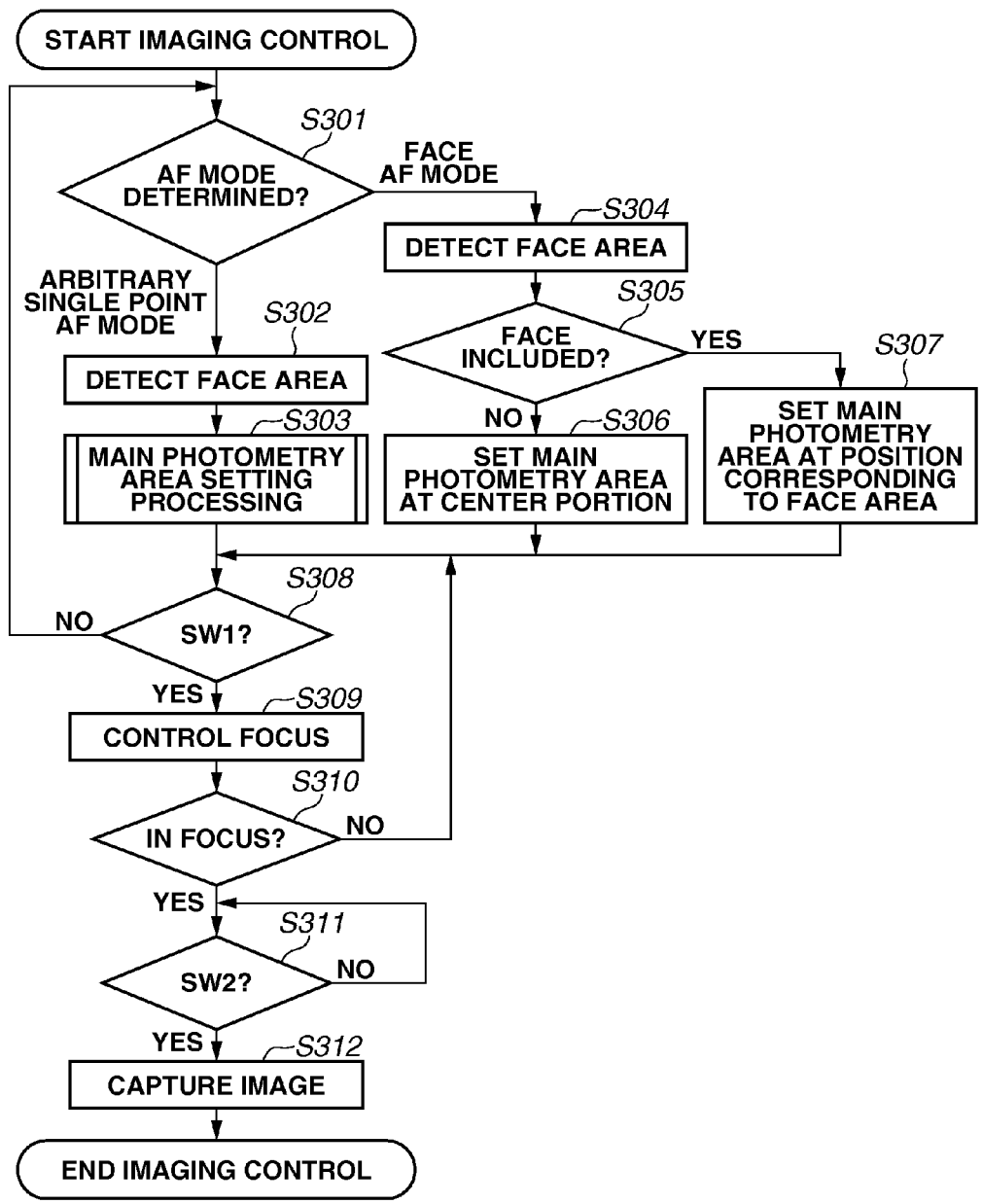
FIG. 3 is a flowchart illustrating second imaging control according to the first exemplary embodiment of the present invention.

Imaging processing (second imaging control) according to the present exemplary embodiment is described below with reference to FIG. 3. FIG. 3 is a flowchart illustrating the second imaging control according to the first exemplary embodiment of the present invention. The processing in steps S301 and S302 is similar to that in steps S201 and S203, so that the description thereof is omitted.

Figure 4:
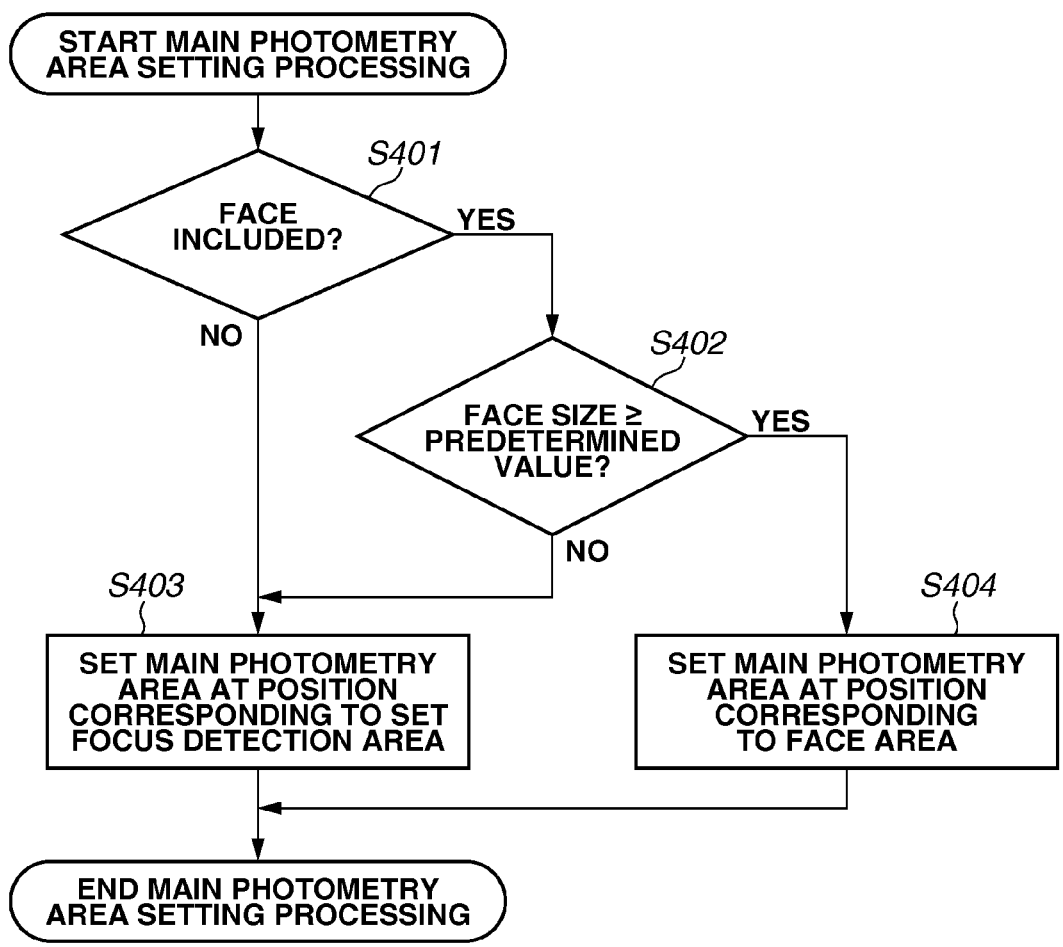
FIG. 4 is a flowchart illustrating main photometry area setting processing according to the first exemplary embodiment of the present invention.

In step S303, the camera microcomputer 101 executes processing for setting a position of the main photometry area in the imaging range (hereinbelow referred to as main photometry area setting processing). The main photometry area setting processing is described below with reference to FIG. 4. FIG. 4 is a flowchart illustrating the main photometry area setting processing according to the first exemplary embodiment of the present invention.

In step S401, the camera microcomputer 101 determines whether a face is included in the imaging range based on the face detection information detected in step S302. If the camera microcomputer 101 determines that a face is not included in the imaging range (NO in step S401), then in step S403, the photometry unit 114 sets the main photometry area to a position corresponding to the focus detection area set by the user and performs photometry on the object.

Whereas if the camera microcomputer 101 determines that a face is included in the imaging range (YES in step S401), the processing proceeds to step S402. In step S402, the camera microcomputer 101 determines whether a size of the detected face (the face evaluation value) is equal to or larger than a predetermined value (a first threshold value) based on the face detection information detected in step S302. Then, according to a result of the above-described determination, the photometry unit (the photometry area setting unit) 114 switches whether to set the main photometry area to a position corresponding to the detected face area or to the position corresponding to the focus detection area set by the user. Details of the processing is described below.

If the camera microcomputer 101 determines that the size of the detected face is smaller than the predetermined value (NO in step S402), the processing proceeds to step S403. In step S403, the photometry unit 114 sets the main photometry area to a position corresponding to the focus detection area already set by the user and performs photometry on the object.

Whereas if the camera microcomputer 101 determines that the size of the detected face is equal to or larger than the predetermined value (YES in step S402), the processing proceeds to step S404. In step S404, the photometry unit 114 sets the main photometry area to a position corresponding to the face area in the imaging range and performs photometry on the object. In the arbitrary single point AF mode according to the present exemplary embodiment, if the position of the main photometry area is changed from the position of the focus detection area set by the user, the focus detection unit 113 does not change the position of focus detection area in the imaging range. The focus detection unit 113 does not change the position of focus detection area in the imaging range until next time the user sets the focus detection area. In other words, according to the present exemplary embodiment, if the position of the main photometry area is set to a position other than the position of the focus detection area set by the user, the position of the focus detection area is not switched until the user sets the focus detection area next. The main photometry area setting processing according to the present exemplary embodiment has been described above.

Details of the above-described main photometry area setting processing are described below with reference to FIGS. 5A and 5B.

Figure 5A:
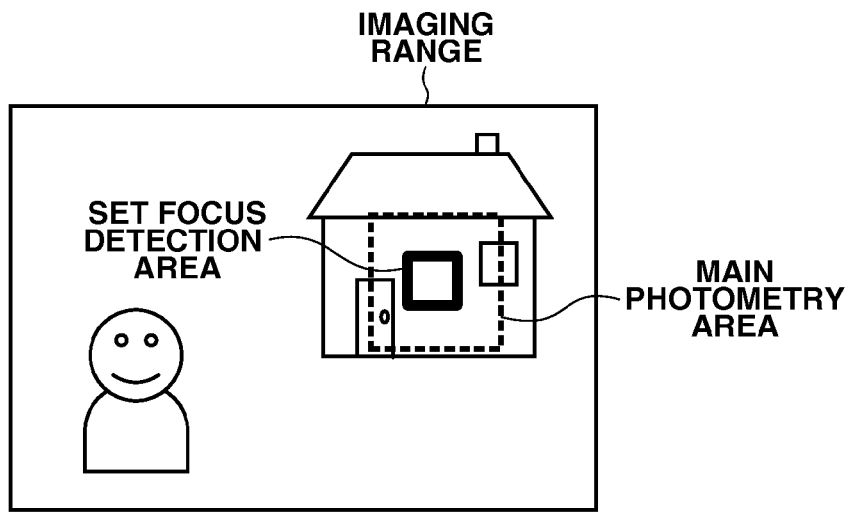
FIGS. 5A and 5B illustrate the main photometry area setting processing according to the first exemplary embodiment of the present invention.
Figure 5B:
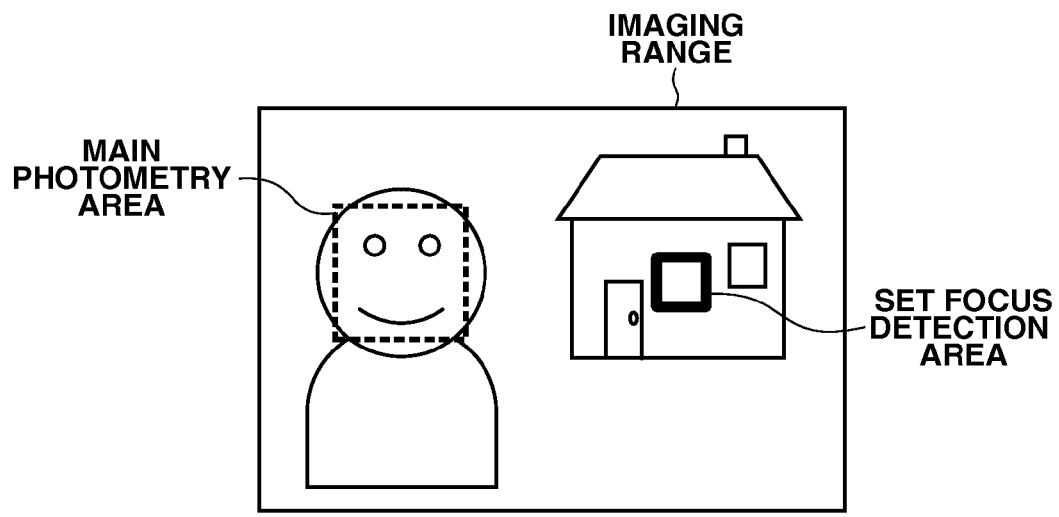

FIGS. 5A and 5B illustrate the main photometry area setting processing according to the first exemplary embodiment of the present invention. FIG. 5A illustrates a state in which a size of a detected face is smaller than a predetermined value, and FIG. 5B illustrates a state in which a size of a detected face is equal to or larger than the predetermined value. As illustrated in FIG. 5A, when the size of the detected face is smaller than the predetermined value, a ratio of the face in the imaging range is small, and it is unlikely that an object corresponding to the detected face is a main object having higher importance of imaging for a user.

In contrast, as illustrated in FIG. 5B, when the size of the detected face is equal to or larger than the predetermined value, a ratio of the face in the imaging range is large, and it is highly likely that an object corresponding to the detected face is a main object having higher importance of imaging for a user.

Thus, even if the arbitrary single point AF mode is set, the camera 1 according to the present exemplary embodiment sets the main photometry area to the position corresponding to the detected face area when the size of the detected face is equal to or larger than the predetermined value (corresponding to the processing in step S404). In addition, when the arbitrary single point AF mode is set and the size of the detected face is smaller than the predetermined value, the camera 1 sets the main photometry area to the position corresponding to the focus detection area set by the user (corresponding to the processing in step S403).

The above-described predetermined value may be any value as long as the value can be used to determine that the detected face area is a main object in the an imaging range. For example, the predetermined value may be set to a value at which a size of a face area is equal to one tenth or more of the entire imaging range. Further, the predetermined value may be set to a value corresponding to a size of one block obtained by dividing image data used for the photometry operation.

The description is returned to FIG. 3. The processing in steps S308, S309, S310, S311 and S312 after step S303 is similar to the above-described processing in steps S207 to S211, respectively, so that the description thereof is omitted. Regarding the determination in step S301, the processing performed when the set AF mode is the face AF mode (in steps S304, S305, S306 and S307) is similar to the above-described processing in steps S203 to S206, respectively, so that the description thereof is omitted. The imaging control according to the present exemplary embodiment has been described above.

As described above, according to the present exemplary embodiment, when the arbitrary single point AF mode is set and a size of the detected face area is equal to or larger than the predetermined value, the main photometry area is set to a position corresponding to the detected face area. Further, according to the present exemplary embodiment, when the arbitrary single point AF mode is set and a size of the detected face area is smaller than the predetermined value, the main photometry area is set to a position corresponding to the focus detection area set by the user.

According to the configuration, when it can be determined that the detected face has higher importance of imaging for a user even if the arbitrary single point AF mode is set, the exposure control can be executed so that brightness of the detected face area will be appropriate. Therefore, when a user arbitrary sets the focus detection area and a face area is included in the imaging range, the camera 1 according to the present exemplary embodiment can execute appropriate exposure control based on information regarding the face area and information regarding the focus detection area set by the user.

According to the present exemplary embodiment, the main photometry area setting processing when the arbitrary single point AF mode is set is described as an example when a user sets the focus detection area to a position in the imaging range, however, the present exemplary embodiment is not limited to this example. For example, the present exemplary embodiment may be configured to execute the above-described main photometry area setting processing according to whether a user sets the focus detection area to a position in the imaging range without being limited to the set AF mode.

In main photometry area setting processing according to a second exemplary embodiment, a configuration is described in which a position to which a main photometry area is set in an imaging range is switched according to a distance between a position of a focus detection area set by a user and a position of a face area. Basic configurations of a camera main body 100 and a lens unit 200 in a digital camera (hereinbelow simply referred to as a camera) 1 are similar to those in the above-described first exemplary embodiment, so that the description thereof is omitted. Further, imaging processing other than the main photometry area setting processing according to the present exemplary embodiment is similar to that in the above-described first exemplary embodiment illustrated in FIG. 3, so that the description thereof is omitted.

Figure 6:
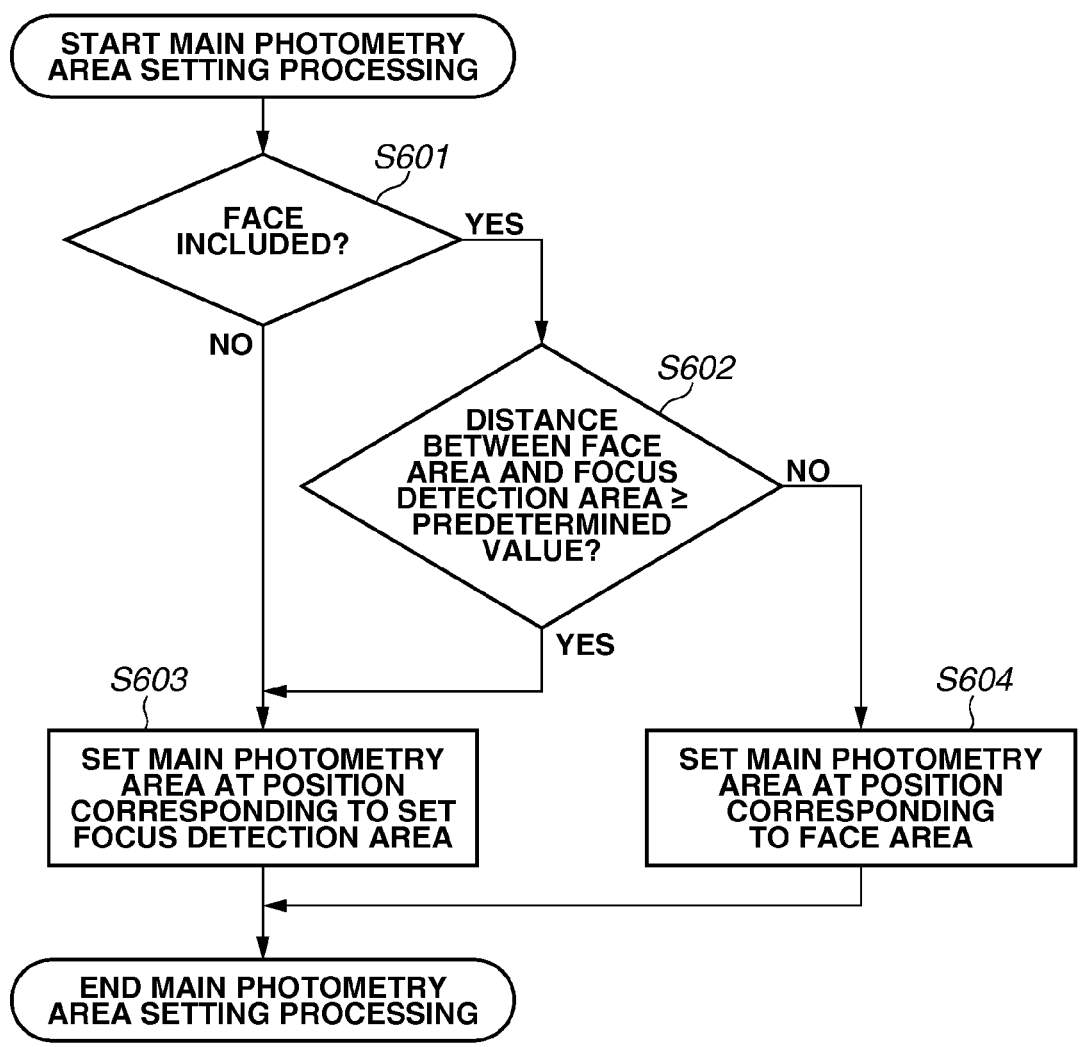
FIG. 6 is a flowchart illustrating main photometry area setting processing according to a second exemplary embodiment of the present invention.

FIG. 6 is a flowchart illustrating the main photometry area setting processing according to the second exemplary embodiment of the present invention. The processing in step S601 is similar to that in step S401 in the above-described first exemplary embodiment, so that the description thereof is omitted.

In step S602, the camera microcomputer 101 obtains information regarding a distance between a position of the face area detected in the imaging range and a position of the focus detection area set by the user (hereinbelow referred to as a photometry determination distance) based on the face detection information detected in step S302. The photometry determination distance corresponds to the face evaluation value according to the above-described first exemplary embodiment.

The information regarding the photometry determination distance may be an actual distance between the position of the detected face area and the position of the set focus detection area or may be a ratio of each area with respect to the entire imaging range. Further, the above-described photometry determination distance is a distance between an approximate center position of the focus detection area and an approximate center position of the face area, however, the photometry determination distance may be a distance between a position of a contour portion of the detected face area to a frame portion of the focus detection area.

Next, the camera microcomputer 101 determines whether the photometry determination distance is equal to or larger than a predetermined threshold value based on the information regarding the detected photometry determination distance. Then, according to a result of the above-described determination, the photometry unit (the photometry area setting unit) 114 switches whether to set the main photometry area to a position corresponding to the detected face area or to the position corresponding to the focus detection area set by the user. Details of the processing is described below.

If the camera microcomputer 101 determines that the photometry determination distance is equal to or larger than the predetermined threshold value (YES in step S602), the processing proceeds to step S603. In step S603, the photometry unit 114 sets the main photometry area to a position in the imaging range corresponding to the focus detection area set by the user and performs photometry on the object.

Whereas if it is determined that the photometry determination distance is smaller than the predetermined threshold value (NO in step S602), the processing proceeds to step S604. In step S604, the photometry unit 114 sets the main photometry area to a position corresponding to the face area in the imaging range and performs photometry on the object. The main photometry area setting processing according to the present exemplary embodiment has been described above. Details of the above-described main photometry area setting processing according to the present exemplary embodiment are described with reference to FIGS. 7A and 7B.

Figure 7A:
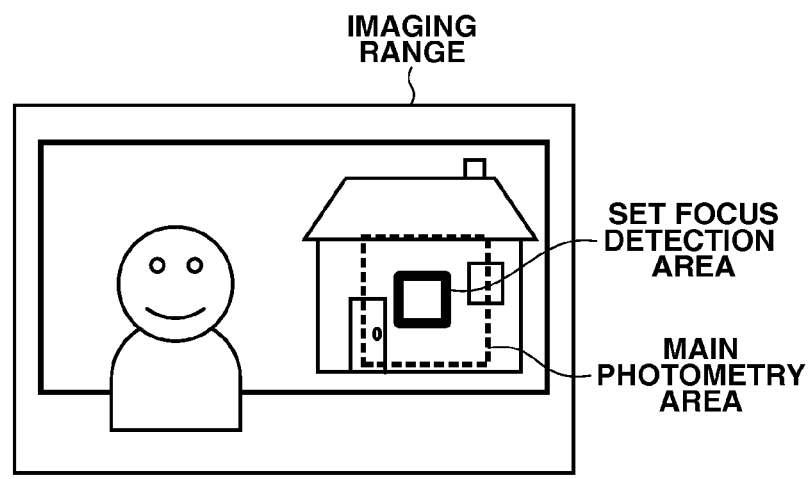
FIGS. 7A and 7B illustrate the main photometry area setting processing according to the second exemplary embodiment of the present invention.
Figure 7B:
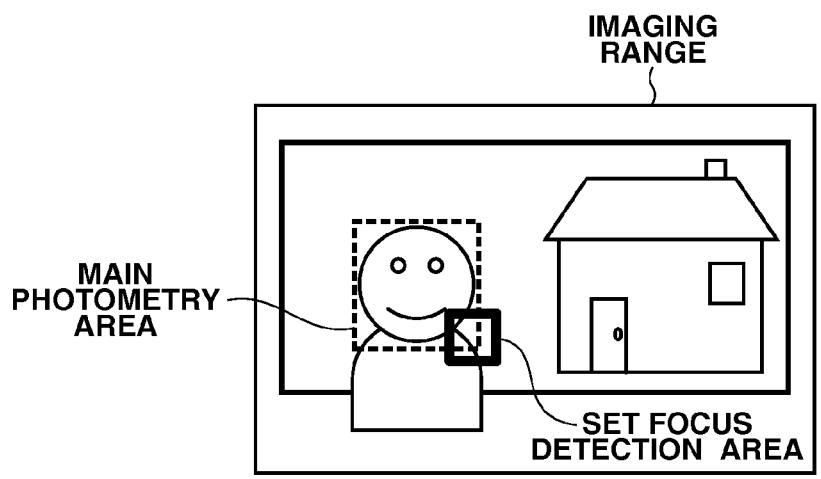

FIGS. 7A and 7B illustrate the main photometry area setting processing according to the second exemplary embodiment of the present invention. FIG. 7A illustrates a state in which a photometry determination distance is equal to or larger than a predetermined threshold value in the imaging range. In other words, FIG. 7A illustrates a state in which the face area is located at a position relatively far from the focus detection area set by the user in the imaging range. FIG. 7B illustrates a state in which the photometry determination distance is smaller than the predetermined threshold value. In other words, FIG. 7B illustrates a state in which the face area is located at a position relatively close to the focus detection area set by the user in the imaging range.

In the case illustrated in FIG. 7A, the face area is detected at the position relatively far from the focus detection area set by the user, and it is unlikely that an object corresponding to the detected face area is a main object having higher importance of imaging for the user.

In contrast, in the case illustrated in FIG. 7B, the face area is detected at the position relatively close to the focus detection area set by the user, and it is highly likely that an object corresponding to the detected face area is a main object having higher importance of imaging for the user.

Thus, even if the arbitrary single point AF mode is set, the camera 1 according to the present exemplary embodiment sets the main photometry area to a position in the imaging range corresponding to the detected face area when the photometry determination distance is smaller than the predetermined threshold value (step S604). In addition, when the arbitrary single point AF mode is set and the photometry determination distance is equal to or larger than the predetermined threshold value, the camera 1 sets the main photometry area to a position in the imaging range corresponding to the focus detection area set by the user (step S603).

The above-described predetermined threshold value may be any value regarding a distance between the face area and the focus detection area as long as the value can be used to determine that the detected face area is highly likely a main object in the imaging range. For example, a value corresponding to a distance of a part of the focus detection area superimposed on a part of the face area may be adopted as the predetermined threshold value. In other words, a value regarding a distance between the focus detection area and the face area which enables determination that the focus detection area is set near the detected face area is set as the above-described predetermined threshold value.

According to the configuration, when the focus detection area is set near the detected face area even if the arbitrary single point AF mode, the exposure control can be executed appropriate for brightness of the detected face. The main photometry area setting processing according to the present exemplary embodiment has been described above.

As described above, according to the present exemplary embodiment, if a distance between a position of the detected face area and a position of the focus detection area is smaller than a predetermined threshold value in the arbitrary single point AF mode, the main photometry area is set to a position in the imaging range corresponding to the detected face area. Further, according to the present exemplary embodiment, if a distance between a position of the detected face area and a position of the focus detection area is equal to or larger than the predetermined threshold value in the arbitrary single point AF mode, the main photometry area is set to a position in the imaging range corresponding to the focus detection area.

According to the configuration, when it can be determined that the detected face area is highly likely to be a main object even if the arbitrary single point AF mode is set, the exposure control can be executed so that brightness of the detected face area will be appropriate. Therefore, when a user arbitrary sets the focus detection area and a face area is included in the imaging range, the camera 1 according to the present exemplary embodiment can execute appropriate exposure control based on information regarding the face area and information regarding the focus detection area set by the user.

In main photometry area setting processing according to a third exemplary embodiment, a configuration is described in which a main photometry area is set according to whether an arbitrary focus detection area set by a user is located on a position superimposed on a human body area corresponding to a detected face when the arbitrary single point AF mode is set as the AF mode. Basic configurations of a camera main body 100 and a lens unit 200 in a digital camera (hereinbelow simply referred to as a camera) 1 are similar to those in the above-described first exemplary embodiment, so that the description thereof is omitted. Further, imaging processing other than the main photometry area setting processing according to the present exemplary embodiment is similar to that in the above-described first exemplary embodiment illustrated in FIG. 3, so that the description thereof is omitted.

Figure 8:
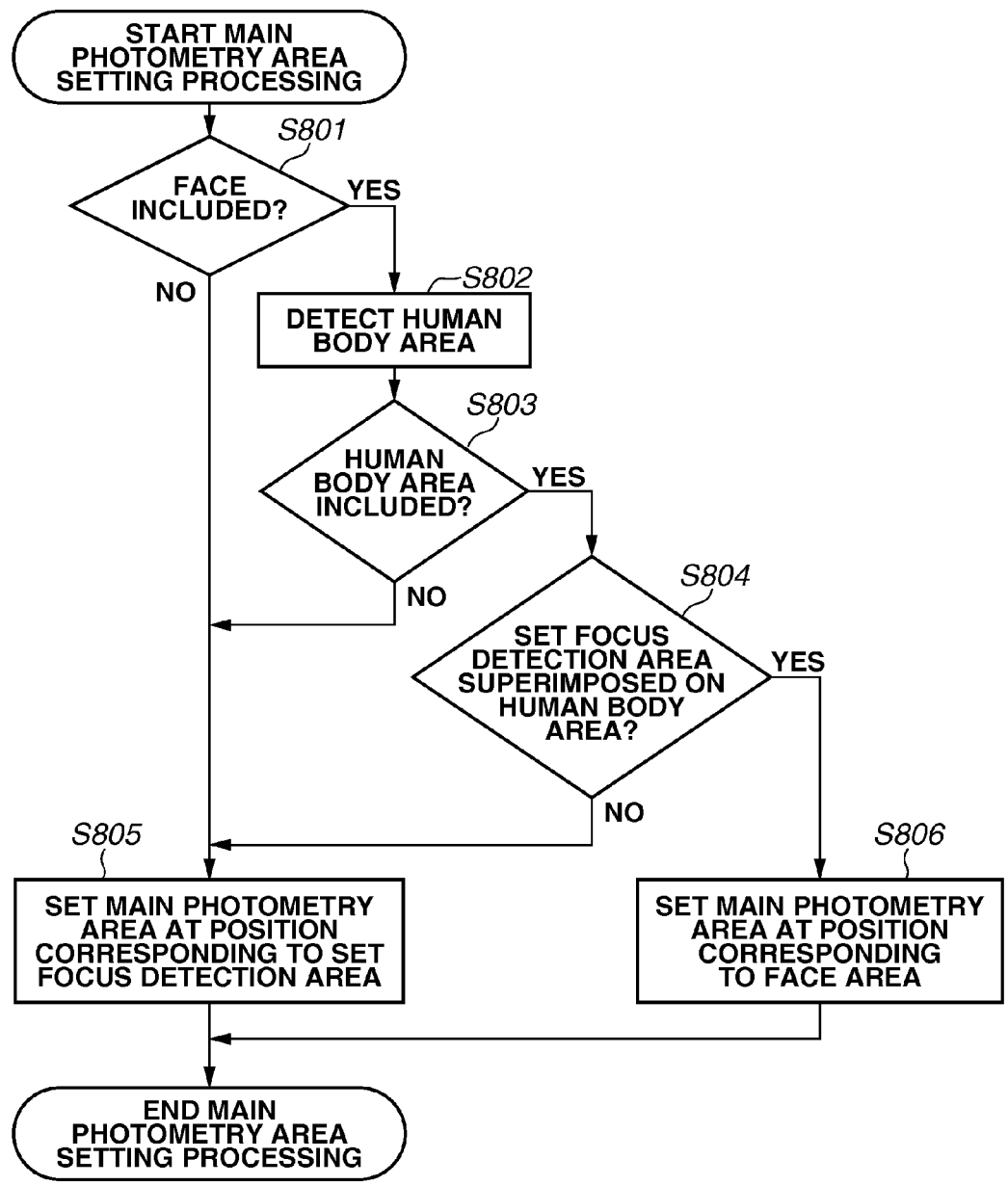
FIG. 8 is a flowchart illustrating main photometry area setting processing according to a third exemplary embodiment of the present invention.

FIG. 8 is a flowchart illustrating the main photometry area setting processing according to the third exemplary embodiment of the present invention, and the main photometry area setting processing is executed when the arbitrary single point AF mode is set in the imaging processing. The processing in step S801 is similar to that in step S401 in the above-described first exemplary embodiment, so that the description thereof is omitted.

In step S802, the human body detection unit (the human body detection module) 116 detects a human body area corresponding to the face detected in step S302 from the imaging range. In step S803, the camera microcomputer 101 determines whether the human body area is included in the imaging range based on a detection result in step S802. If the camera microcomputer 101 determines that the human body area is not included in the imaging range (NO in step S803), the processing proceeds to step S805. Whereas if the camera microcomputer 101 determines that the human body area is included in the imaging range (YES in step S803), the processing proceeds to step S804.

Next, in step S804, the camera microcomputer 101 determines whether the focus detection area is superimposed on the detected human body area in the imaging range based on the human body area detected in step S802 and information regarding the focus detection area set by the user. According to the above-described determination result, the photometry unit (a photometry area setting unit) 114 selects whether to set the main photometry area to a position corresponding to the detected face area or to a position corresponding to the focus detection area set by the user. Details of the processing is described below.

If the camera microcomputer 101 determines that the focus detection area set by the user is not superimposed on the human body area detected in step S802 (NO in step S804), the processing proceeds to step S805. In step S805, the photometry unit 114 sets the main photometry area to a position in the imaging range corresponding to the focus detection area set by the user and performs photometry on the object.

Whereas if the camera microcomputer 101 determines that the focus detection area set by the user is superimposed on the human body area detected in step S802 (YES in step S804), the processing proceeds to step S806. In step S806, the photometry unit 114 sets the main photometry area to a position in the imaging range corresponding to the face area corresponding to the detected human body area and performs photometry on the object. The main photometry area setting processing according to the present exemplary embodiment has been described above. Details of the above-described main photometry area setting processing according to the present exemplary embodiment are described with reference to FIGS. 9A and 9B.

Figure 9A:
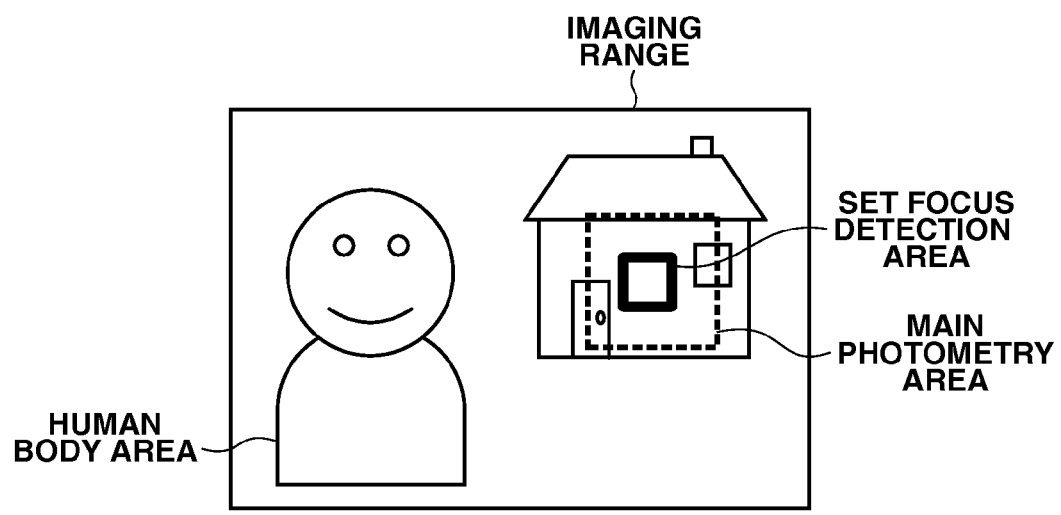
FIGS. 9A and 9B illustrate the main photometry area setting processing according to the third exemplary embodiment of the present invention.
Figure 9B:
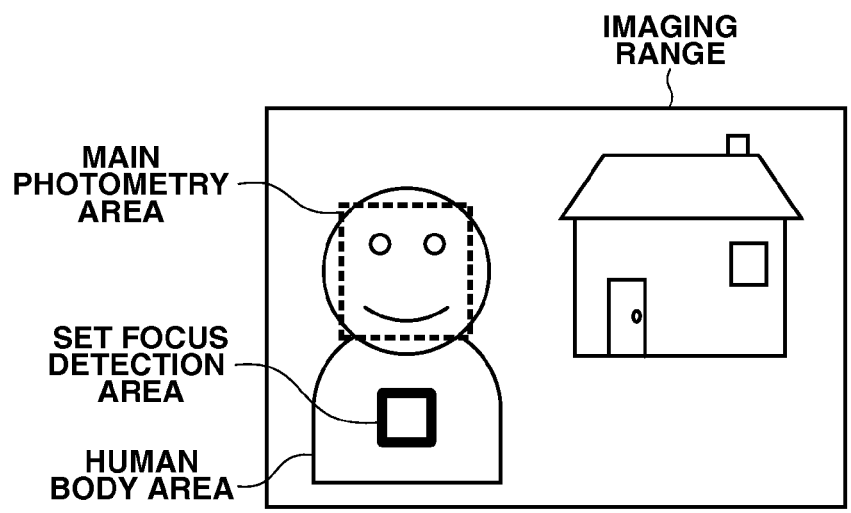

FIGS. 9A and 9B illustrate the main photometry area setting processing according to the third exemplary embodiment of the present invention. FIG. 9A illustrates a state in which the focus detection area set by the user exists on a building portion at a position not superimposed on the detected human body area in the imaging range. FIG. 9B illustrates a state in which the focus detection area set by the user exists at a position superimposed on the detected human body area in the imaging range. In FIG. 9B, the focus detection area set by the user exists within the detected human body area.

As illustrated in FIG. 9A, when the focus detection area set by the user exists at a position sufficiently far away from the detected human body area, it is unlikely that the object (the person) corresponding to the human body area is a main object having higher importance of imaging for the user. For example, in the state illustrated in FIG. 9A, it is highly likely that the building to which the focus detection area is set by the user is the main object having higher importance of imaging for the user.

In addition, as illustrated in FIG. 9B, when the focus detection area set by the user is located (exists) at a position superimposed on the human body area, it is highly likely that the object (the person) corresponding to the human body area is the main object having higher importance of imaging for the user. Generally, when a main object having higher importance of imaging for a user is a person, it is desirable to obtain an image in which the person's face has optimum brightness.

In this case, if a user sets the focus detection area in a human body area in the imaging range, it is desirable to execute the exposure control so that a face area corresponding to the human body area has appropriate brightness.

Thus, even if the arbitrary single point AF mode is set, the camera 1 according to the present exemplary embodiment sets the main photometry area to a position corresponding to the face area corresponding to the human body area when the set focus detection area exists at a position superimposed on the detected human body area in the imaging range. According to the configuration, when the focus detection area is set at a position superimposed on the human body area even if the arbitrary single point AF mode is set, the exposure control can be executed so that brightness of the face area corresponding to the human body area will be appropriate. The main photometry area setting processing according to the present exemplary embodiment has been described above.

As described above, according to the present exemplary embodiment, if the focus detection area set by the user is superimposed on the human body area corresponding to the detected face area in the arbitrary single point AF mode, the main photometry area is set to a position in the imaging range corresponding to the face area corresponding to the human body area.

Further, according to the present exemplary embodiment, if the focus detection area set by the user is not superimposed on the human body area corresponding to the detected face area in the arbitrary single point AF mode, the main photometry area is set to a position in the imaging range corresponding to the focus detection area.

According to the configuration, when it can be determined that the detected face area is highly likely to be a main object even if the arbitrary single point AF mode is set, the exposure control can be executed so that brightness of the detected face area will be appropriate. Therefore, when a user arbitrarily sets the focus detection area and a face area is included in the imaging range, the camera 1 according to the present exemplary embodiment can perform appropriate exposure control based on information regarding the face area and information regarding the focus detection area set by the user.

While the present invention has been described with reference to the exemplary embodiments, however, the present invention is not limited to the above-described exemplary embodiments, and various modifications and changes may be made without departing from the scope of the present invention. For example, the arbitrary single point AF mode and the face AF mode are described as the AF modes in the above-described exemplary embodiments, however, the exemplary embodiments may be configured to be able to set the AF modes other than these modes.

Further, in the main photometry area setting processing according to the above-described exemplary embodiments, the main photometry area is set based on a position of a face area as a result that the face area is included in the imaging range, however, the main photometry area setting processing is not limited to this configuration. For example, when the face area is included in the imaging range in the arbitrary single point AF mode, the camera microcomputer (a view angle deviation detection unit) 101 detects a deviation amount of the imaging range (a deviation amount of an angle of view). When the detected deviation amount of an angle of view is equal to or smaller than a preset value, the camera microcomputer 101 sets the main photometry area to a position in the imaging range corresponding to the focus detection area set by the user.

Further, when the detected deviation amount of an angle of view is larger than the preset value, the camera microcomputer 101 sets the main photometry area to a position in the imaging range corresponding to the face area. The above-described deviation amount of the imaging range is detected by comparing the imaging range immediately before the focus detection area is set by the user with the imaging range immediately after the focus detection area is set.

According to the configuration, when the face area is included in the imaging range, the main photometry area can be set to a position in the imaging range corresponding to the face area in response to deviation of an angle of view in image capturing. Therefore, when a user sets the focus detection area and the face area is included in the imaging range, the exposure control can be executed more effectively based on information regarding the face area and information regarding the focus detection area set by the user.

In addition, the main photometry area setting processing according to each of the above-described exemplary embodiments may be performed by combining with each other. For example, when a size of the detected face area is equal to or larger than a predetermined threshold value (for example, a first threshold value) and a distance between the face area and the focus detection area is smaller than a predetermined threshold value (for example, a second threshold value), the main photometry area may be set to a position in the imaging range corresponding to the face area. Further, in the main photometry area setting processing, when a size of the detected face area is equal to or larger than a predetermined threshold value and the set focus detection area is superimposed on the human body area in the imaging range, the main photometry area may be set to a position in the imaging range corresponding to the face area.

Furthermore, when a plurality of face areas is detected, a position to which the main photometry area is set in the imaging range may be controlled by comparing sizes of the plurality of detected face areas or lengths of distances between the plurality of face areas and the focus detection area.

For example, when a face area A having a first area and a face area B having a second area smaller than the first area exist in the imaging range, the main photometry area may be set based on a position of the face area A. According to the configuration, the main photometry area can be set to a position corresponding to a face area which occupies a largest area in the imaging range and of which probability that a user intends to capture an image thereof is high.

A case is considered that there are the face area A of which a distance from the focus detection area is a first distance and the face area B of which a distance from the focus detection area is a second distance shorter than the first distance. In this case, the main photometry area may be set to a position in the imaging range corresponding to the face area B of which a distance from the focus detection area is shorter. According to the configuration, the main photometry area can be set to a position in the imaging range corresponding to the face area which exists the nearest position from the focus detection area set by the user and of which probability that a user intends to capture an image thereof is high. According to the above-described configuration, when the arbitrary single point AF mode is set and a plurality of face areas is included in the imaging range, it can be obtained an image having brightness appropriate for an object having higher importance of imaging for a user.

Further, according to the above-described exemplary embodiments, the configuration has been described which changes a position to which the main photometry area is set in the imaging range when a face area included in the imaging range is detected, however, the exemplary embodiments are not limited to this configuration. For example, it may be configured that the camera microcomputer 101 detects an object other than a person and switches a position to which the main photometry area is set in the imaging range based on information regarding the detected the object and information regarding the focus detection area set by the user.

The object may include, for example, a specific structure (a car, a train, and the like) and an animal.

According to the above-described exemplary embodiments, it is configured that the camera microcomputer 101, the focus detection unit 113, the photometry unit 114, the face detection unit 115, the human body detection unit 116, and others operate in cooperation with each other to control operations of the camera 1, however, the exemplary embodiments are not limited to this configuration. For example, a program according to the above-described flowcharts in FIGS. 3, 4, 6, and 8 is stored in the memory 102 in advance, and the operations of the camera 1 may be controlled by the camera microcomputer 101 executing the program.

In addition, as long as a function of a program is included, a program may be in any form, such as an object code, a program executed by an interpreter, and script data supplied to an operating system (OS). A storage medium supplying a program may include, for example, a hard disk, a magnetic storage medium such as a magnetic tape, and an optical/magnetooptical storage medium.

According to the above-described exemplary embodiments, the digital camera 1 is described as an example of the image capturing apparatus implementing the present invention, however, the present invention is not limited to the digital camera 1. The present invention can be applied to various image capturing apparatuses, for example, a digital video camera and a portable device such as a smartphone, within the scope of the appended claims.

Other Embodiments

The present invention can be realized by processing for supplying a program realizing functions of one or more of the above-described exemplary embodiments to a system or an apparatus via a network or a storage medium and causing one or more processors in the system or in a computer of the apparatus to read and execute the program. Further, the present invention can be realized by a circuit realizing one or more functions (for example, an application specific integrated circuit (ASIC)).

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-251272, filed Dec. 11, 2014, which is hereby incorporated by reference herein in its entirety.

What is claimed is:

1. An image capturing apparatus enabling a user to set a focus detection area to a position in an imaging range, the image capturing apparatus comprising:
at least one processor that operates to:
perform photometry on an object;
detect a face area included in the imaging range;
set a position of a main photometry area in the imaging range; and
perform focus detection based on the focus detection area set by a user,
wherein, in a case where a user sets the focus detection area to a position in the imaging range and the at least one processor detects the face area, the at least one processor determines whether to set a position of the main photometry area to a position corresponding to the face area or to set a position of the main photometry area to a position corresponding to the focus detection area based on information regarding the face area and information regarding the focus detection area set by the user,
wherein the at least one processor performs photometry on the object based on a position of the main photometry area; and
wherein, in a case where the focus detection area is set by the user to a positon which is out of the face area detected by the at least one processor in the imaging range, the at least one processor performs focus detection with not changing the focus detection area set by the user when the main photometry area is set to the position corresponding to the face area.

2. The image capturing apparatus according to claim 1, wherein, in a case where a user sets the focus detection area to the position which is out of the face area detected by the at least one processor in the imaging range and the at least one processor detects the face area, the at least one processor sets a position of the main photometry area to a position corresponding to the face area if a distance between a position of the face area and a position of the focus detection area is smaller than a predetermined threshold value and sets a position of the main photometry area to a position corresponding to the focus detection area if a distance between a position of the face area and a position of the focus detection area is equal to or larger than the predetermined threshold value.

3. The image capturing apparatus according to claim 2, wherein, in a case where a plurality of the face areas is detected and the main photometry area is set to any of the plurality of the face areas, the at least one processor sets a position of the main photometry area to a position corresponding to a face area of which a distance to the focus detection area is smallest among the plurality of the face areas.

4. The image capturing apparatus according to claim 1, wherein the at least one processor further operates to detect a human body area included in the imaging range,
wherein, in a case where a user sets the focus detection area to a position which is out of the face area detected by at least one processor in the imaging range, the at least one processor detects the face area, detects the human body area, and sets a position of the main photometry area to a position corresponding to the face area corresponding to the human body area if the focus detection area is superimposed on the human body area.

5. The image capturing apparatus according to claim 1, wherein, in a case where a user sets the focus detection area to a position in the imaging range and the at least one processor does not detect the face area, the at least one processor sets a position of the main photometry area to a position corresponding to the focus detection area.

6. The image capturing apparatus according to claim 1, wherein the at least one processor further operates to execute exposure control based on a photometry result,
wherein the at least one processor makes a degree of weighting regarding exposure control with respect to the photometry result at a position of the main photometry area in the imaging range larger than that in an area other than the main photometry area in the imaging range to execute exposure control.

7. The image capturing apparatus according to claim 6, wherein the at least one processor executes exposure control based on only a photometry result of the corresponding to an object included in the main photometry area set by the at least one processor.

8. The image capturing apparatus according to claim 6, wherein the main photometry area is an area of which a degree of weighting with respect to a photometry result used for the exposure control is made larger than other areas in the imaging range.

9. The image capturing apparatus according to claim 1, wherein, even in a case where a position of the main photometry area is set to a position other than a position of the focus detection area set by a user, the position of the focus detection area is not changed until the user sets the focus detection area next.

10. The image capturing apparatus according to claim 1, wherein, in a case where a user sets the focus detection area to the position which is out of the face area detected by the at least one processor in the imaging range and the at least one processor detects the face area, the at least one processor sets a position of the main photometry area to a position corresponding to the face area if a deviation amount of the imaging range in a predetermined period is larger than a value set in advance.

11. The image capturing apparatus according to claim 1, wherein, in a case where the position corresponding to the face area is different from the position corresponding to the focus detection area set by the user in the imaging range, the at least one processor determines a position of the main photometry area to the position corresponding to the face area or the position corresponding to the focus detection area.

12. An image capturing apparatus enabling a user to set a focus detection area to a position in an imaging range, the image capturing apparatus comprising:
at least one processor that operates to:
perform photometry on an object;
detect a face area included in the imaging range;
calculate a face evaluation value regarding a face area detected by the at least one processor;
set a position of a main photometry area in the imaging range; and
perform focus detection based on the focus detection area set by a user,
wherein, in a case where a user sets the focus detection area to a position in the imaging range and the at least one processor detects the face area, the at least one processor sets the main photometry area to a position corresponding to the face area if an evaluation value regarding the face area calculated by the at least one processor is equal to or larger than a predetermined threshold value and sets the main photometry area to a position corresponding to the focus detection area if the evaluation value calculated by the at least one processor is smaller than the predetermined threshold value,
wherein the at least one processor performs photometry on the object based on a position of the main photometry area set by the at least one processor, and
wherein, in a case where the focus detection area is set by the user to a positon which is out of the face area detected by the at least one processor in the imaging range, the at least one processor performs focus detection with not changing the focus detection area set by the user when the main photometry area is set to the position corresponding to the face area.

13. The image capturing apparatus according to claim 12, wherein, in a case where a user sets the focus detection area to the position which is out of the face area detected by the at least one processor in the imaging range and the at least one processor detects the face area, the at least one processor sets a position of the main photometry area to a position corresponding to the face area if a size of the face area is equal to or larger than a first threshold value and sets a position of the main photometry area to a position corresponding to the focus detection area if a size of the face area is smaller than the first threshold value.

14. The image capturing apparatus according to claim 13, wherein, in a case where a plurality of the face areas is detected and the main photometry area is set to any of the plurality of the face areas, the at least one processor sets a position of the main photometry area to a position corresponding to a face area occupying a largest area in the imaging range among the plurality of the face areas.

15. The image capturing apparatus according to claim 12, wherein, in a case where the position corresponding to the face area is different from the position corresponding to the focus detection area set by the user in the imaging range, the at least one processor determines a position of the main photometry area to the position corresponding to the face area or the position corresponding to the focus detection area.

16. A method for controlling an image capturing apparatus enabling a user to set a focus detection area to a position in an imaging range, the method comprising:
performing photometry on an object;
detecting a face area included in the imaging range;
performing photometry area setting for setting a position of a main photometry area in the imaging range; and
performing focus detection based on the focus detection area set by a user,
wherein, in a case where a user sets the focus detection area to a position in the imaging range and the face area is detected in the detecting, the photometry area setting determines whether to set a position of the main photometry area to a position corresponding to the face area or to set a position of the main photometry area to a position corresponding to the focus detection area based on information regarding the face area and information regarding the focus detection area set by the user,
wherein photometry is performed on the object based on a position of the main photometry area set in the photometry area setting, and
wherein, in a case where the focus detection area is set by the user to a position which is out of the face area in the imaging range, performing the focus detection includes performing focus detection with not changing the focus detection area set by the user when the main photometry area is set to the position corresponding to the face area.

17. A method for controlling an image capturing apparatus enabling a user to set a focus detection area to a position in an imaging range, the method comprising:
performing photometry on an object;
detecting a face area included in the imaging range;
calculating an evaluation value regarding a face area detected in the detecting;
performing photometry area setting for setting a position of a main photometry area in the imaging range;
performing focus detection based on the focus detection area set by a user,
wherein, in a case where a user sets the focus detection area to a position in the imaging range and the face area is detected in the detecting, the photometry area setting sets the main photometry area to a position corresponding to the face area if an evaluation value regarding the face area calculated in the calculating is equal to or larger than a predetermined threshold value and sets the main photometry area to a position corresponding to the focus detection area if the evaluation value calculated in the calculating is smaller than the predetermined threshold value,
wherein photometry is performed on the object based on a position of the main photometry area set in the photometry area setting, and
wherein, in a case where the focus detection area is set by the user to a position which is out of the face area in the imaging range, performing the focus detection includes performing focus detection with not changing the focus detection area set by the user when the main photometry area is set to the position corresponding to the face area.

18. A non-transitory computer-readable storage medium storing a computer-readable program causing a computer to execute a method for controlling an image capturing apparatus enabling a user to set a focus detection area to a position in an imaging range, the method comprising:
performing photometry on an object;
detecting a face area included in the imaging range;
performing photometry area setting for setting a position of a main photometry area in the imaging range; and
performing focus detection based on the focus detection area set by a user,
wherein, in a case where a user sets the focus detection area to a position in the imaging range and the face area is detected in the detecting, the photometry area setting
determines whether to set a position of the main
photometry area to a position corresponding to the face
area or to set a position of the main photometry area to
a position corresponding to the focus detection area
based on information regarding the face area and
information regarding the focus detection area set by
the user, wherein photometry is performed on the object based on
a position of the main photometry area set in the
photometry area setting, and wherein, in a case where the focus detection area is set by
the user to a position which is out of the face area in the
imaging range, performing the focus detection includes
performing focus detection with not changing the focus
detection area set by the user when the main photometry area is set to the position corresponding to the face
area.

19. A non-transitory computer-readable storage medium
storing a computer-readable program causing a computer to
execute a method for controlling an image capturing apparatus enabling a user to set a focus detection area to a
position in an imaging range, the method comprising:

performing photometry on an object;
detecting a face area included in the imaging range;
calculating an evaluation value regarding a face area
detected in the detecting;
performing photometry area setting for setting a position
of a main photometry area in the imaging range; and
performing focus detection based on the focus detection
area set by a user, wherein, in a case where a user sets the focus detection
area to a position in the imaging range and the face area
is detected in the detecting, the photometry area setting
sets the main photometry area to a position corresponding to the face area if an evaluation value regarding the
face area calculated in the calculating is equal to or
larger than a predetermined threshold value and sets the
main photometry area to a position corresponding to
the focus detection area if the evaluation value calculated in the calculating is smaller than the predetermined threshold value, wherein photometry is performed on the object based on
a position of the main photometry area set in the
photometry area setting, and wherein, in a case where the focus detection area is set by
the user to a position which is out of the face area in the
imaging range, performing the focus detection includes
performing focus detection with not changing the focus
detection area set by the user when the main photometry area is set to the position corresponding to the face
area.

* * * * *